United States Patent [19]

Carter et al.

[11] Patent Number: 4,497,470
[45] Date of Patent: Feb. 5, 1985

[54] POWERED CART MOUNTED CABLE PULLER

[76] Inventors: William M. Carter, Rt. #1, Box 74-D-5, Daytona Beach, Fla. 32014; John M. Rodgers, 1722 "B" Avenue, Ormond Beach, Fla. 32074

[21] Appl. No.: 367,180
[22] Filed: Apr. 12, 1982
[51] Int. Cl.³ .............................................. E21C 29/16
[52] U.S. Cl. ............................. 254/134.3 FT; 254/289; 254/330
[58] Field of Search ............... 254/134.3 R, 134.3 FT, 254/330, 289, 134.3 PA

[56] References Cited

U.S. PATENT DOCUMENTS

| | | | |
|---|---|---|---|
| 2,464,907 | 3/1949 | Unruh | 254/330 |
| 2,655,653 | 10/1953 | Chauvin | 254/134.3 FT |
| 2,896,911 | 7/1959 | Carpenter | 254/134.3 FT |
| 2,948,510 | 8/1960 | Kieser | 254/134.3 FT |
| 3,072,382 | 1/1963 | Jones | 254/134.3 FT |
| 3,072,383 | 1/1963 | Vanderhagen | 254/134.3 R |
| 3,190,616 | 6/1965 | Oleson | 254/134.3 FT |
| 3,968,952 | 7/1976 | Newell | 254/134.3 R |

*Primary Examiner*—Robert C. Watson
*Attorney, Agent, or Firm*—David S. Woronoff

[57] ABSTRACT

A device for pulling electrical cable through conduit having a rigid frame with two wheels mounted thereon for being moved in a wheelbarrow like fashion and having attached to the frame a motor for driving a torque converter and speed reduced which drive a shaft which is clutched and which has a reel of cable connected thereto in which a guide and support mechanism directs the cable to the reel and support the entire device in a fixed position relative to the conduit through which the cable is being pulled and in which the motor can be remotely controlled by a switch.

3 Claims, 6 Drawing Figures

POWERED CART MOUNTED CABLE PULLER

BRIEF SUMMARY OF THE INVENTION

The present invention relates to a novel combination of cart and cable puller for use by licensed electricians and others in pulling wire and cable through conduit. Commercially available devices currently used by licensed electricians for pulling cable through conduit use a powered capstan. One such device is identified as Greenlee Kebi model 6640 heavy duty mobile cable puller. This device weights 2400 pounds and is 86 inches by 42 inches by 44 inches. Another Greenlee system is identified as model 686 and includes a powered capstan, a small two wheeled cart and a pipe adapter sheave among other parts. The power cable puller with an aluminum capstan weighs 60 pounds by itself.

Enerpac Division of Applied Power, Inc. sells models CP-3000 and CP-2000 which are similar in design and construction to Greelee model 686. Both Enerpac models use a powered capstan assembly called CP-500.

The present invention has a combination cart, drive mechanism, clutch and shift assembly and take-up reel mechanism. Unlike the devices currently in use, the present invention returns the leader cable, wire or rope to a reel instead of leaving it at the feet of the operator. More importantly the operator's hands are now free to do another task. The clutch and shift mechanism make it possible to feed the leader wire from the reel without having to work against the the drive motor. While the device is pulling cable, the leader wire is gathered on the reel and not dropped at the foot of the operator.

Importantly, the present invention offers the working electrician a pre-assembled package less than 24 inches wide adaptable to a wide range of practical situations which allows one man to do work which formerly required two men. Further, because the device during the cable pulling portion of its use cycle does not require an operator to pull rope off a capstan, the operator can observe the cable being pulled from the source of the cable and stop the pulling of cable if a snag develops merely by turning an electrical switch.

DETAILED DESCRIPTION

Figure 1:
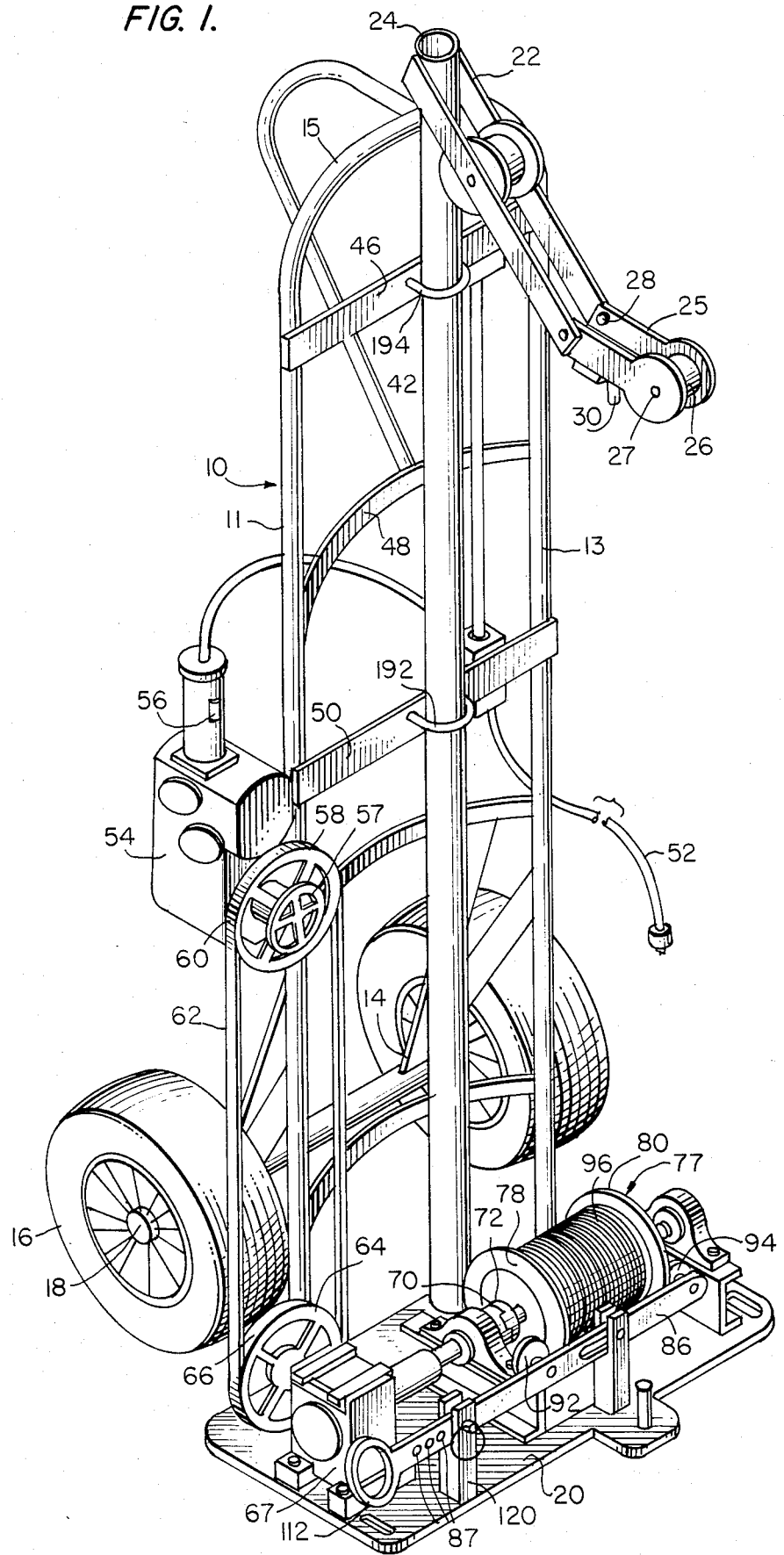
FIG. 1 shows a perspective view of one embodiment of the present invention.
Figure 2:
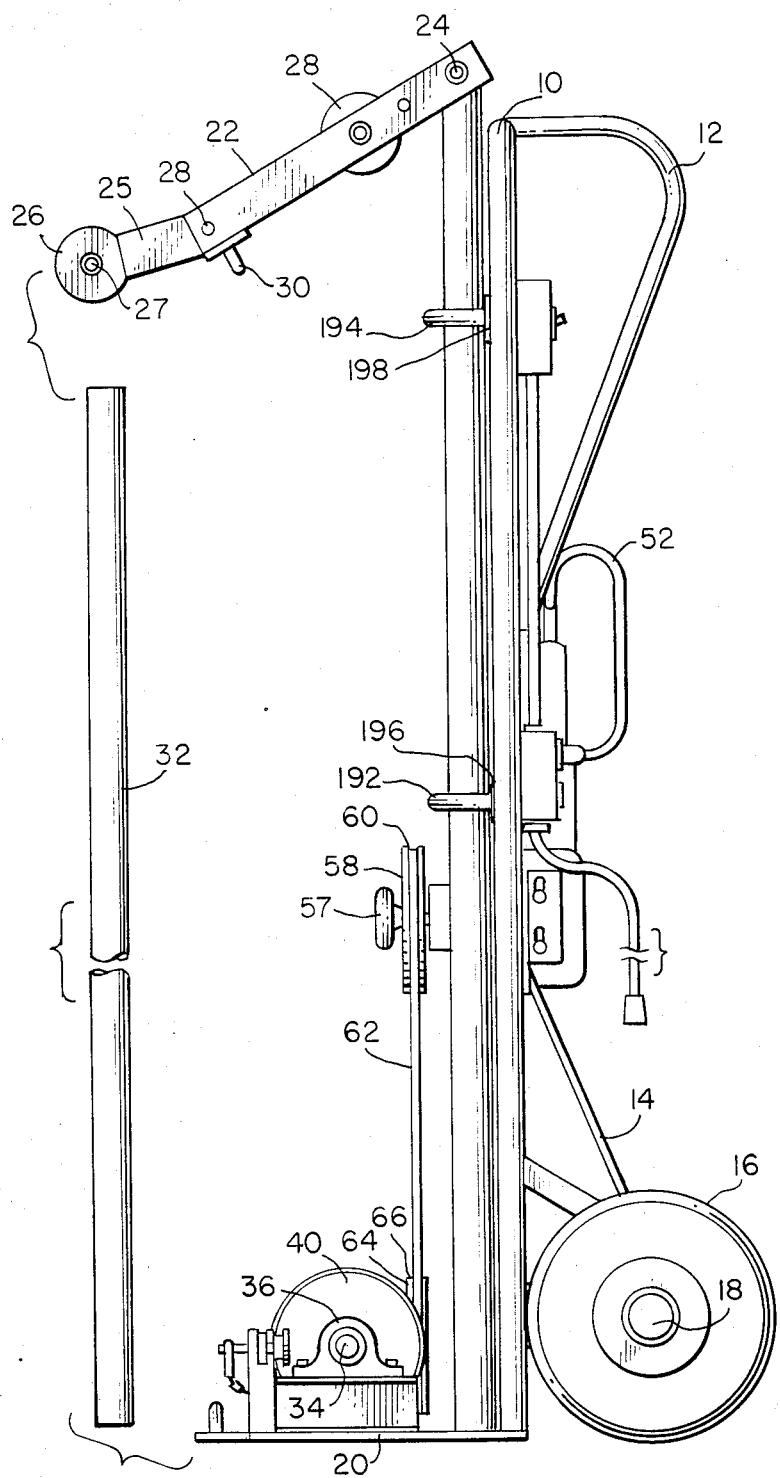
FIGS. 2, 3 and 4 show respectively side, front and top views of the embodiment of the inventions shown in FIG. 1.
Figure 3:
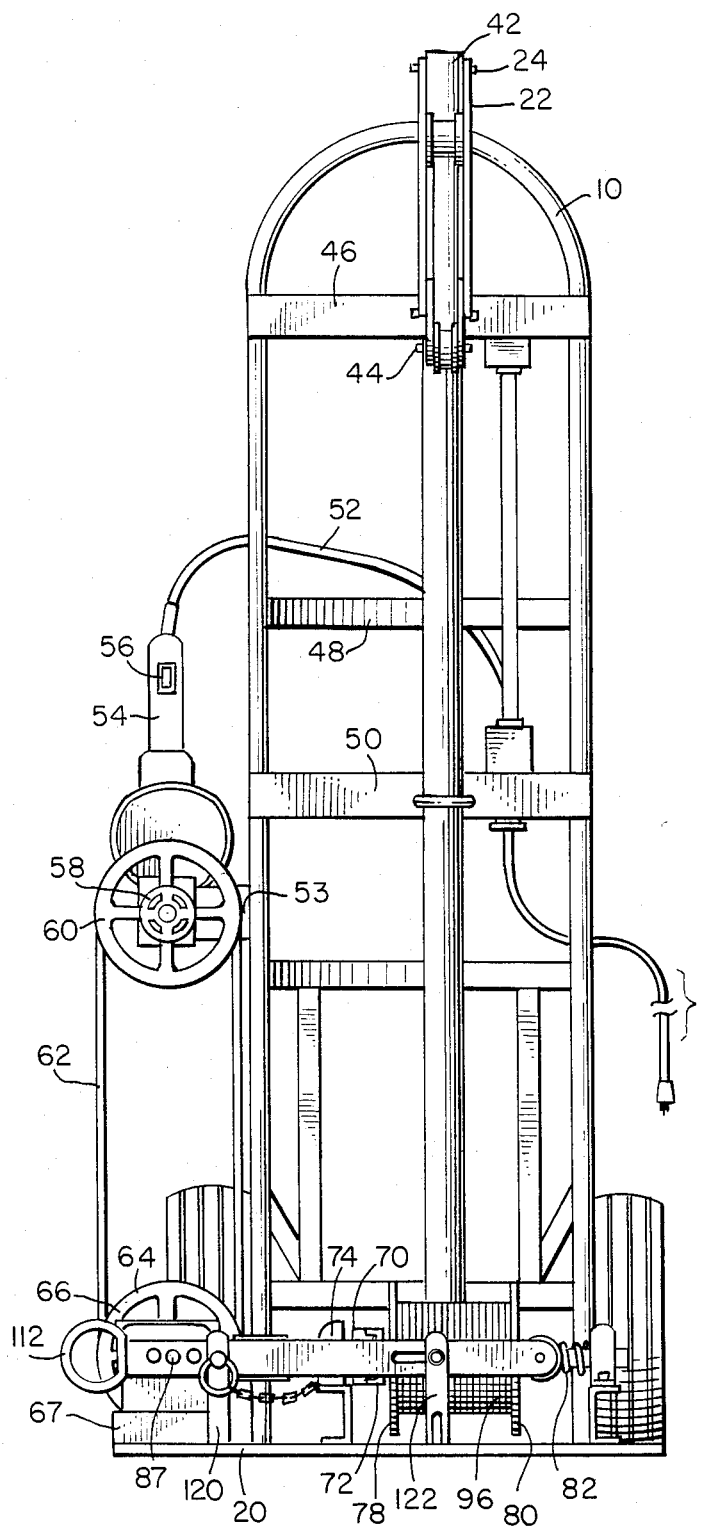
Figure 4:
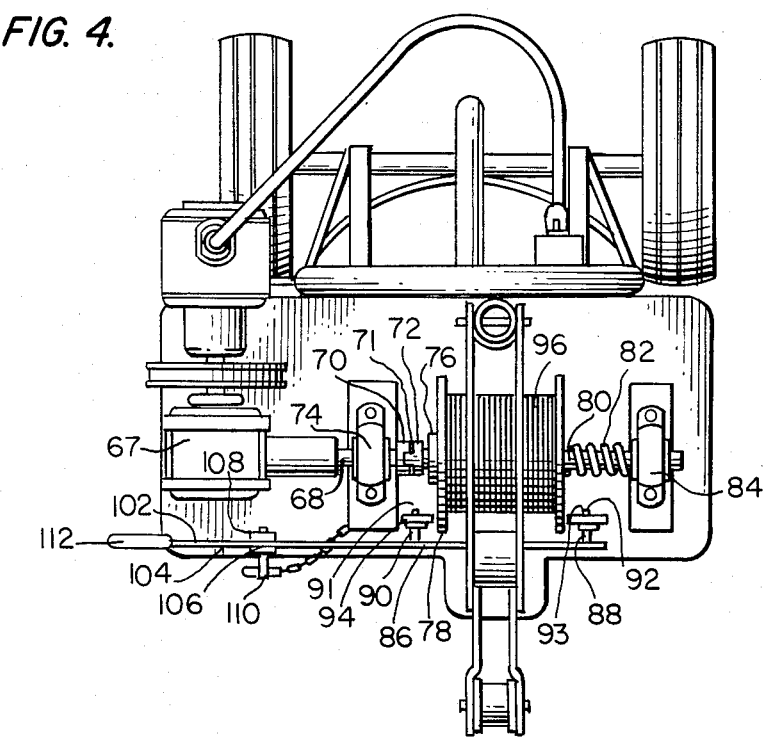
Figure 5:
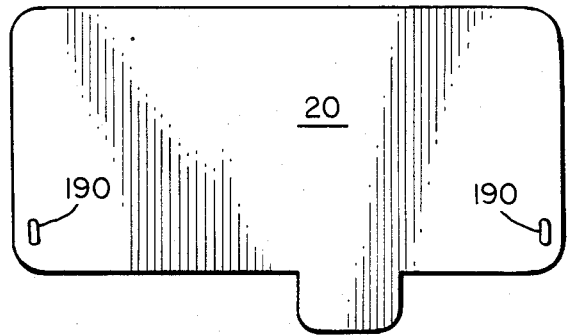
FIG. 5 shows a detail view of the base plate portion of one embodiment of the present invention.

The overall structure is best seen in FIGS. 1 through 4. A frame 10 has side rails 11,13 joined by a top rib 15. Three cross members 46, 48 and 50 give additional structural stability to the frame 10. The frame 10 also has a vertical strut 44 and a base 20. The frame may be assembled by any reasonable system such as welding. Also attached to the frame are bow shaped struts 12 and wheel support struts 14. Wheels 16 are attached to struts 14 through axles 18 in a conventional way.

A hollow tube member 42 is attached to the frame 10 adjacent the vertical strut 44 and is rotatable relative to the Cart 10. "U" bolts 192, 194 and nuts 196, 198 hold tube 42 to frame 10 but allows it to rotate. Reel 77 has sides 78 and 80 which are guided in position by rollers 92, 94 which are mounted on axles 91, 93 from supports 90, 88 formed on shaft 86.

An outwardly extending upper shaft member 72 is pivotally connected to hollow tube member 42 through axle 24. Shaft 22 has an extending arm 25 mounted thereon for rotation about pin 28. A pulley 26 is mounted for rotation about axle 27 on arm 25. Shaft 22 is able to rotate about axle 24 nearly 360° and arm 25 is able to rotate about shaft 22 360°. Second arm member 30 also extends outwardly from shaft 22 near its connection with arm 25. Stiff leg 32 is adapted to mate with second arm member 30 for the purpose of enabling the device to pull cable in an upward direction against stiff leg 32 which is in solid firm contact with the floor or a side wall if it is desired to pull cable in a horizontal direction.

Bracket 53 holds an electric motor 54 which receives power through cord 52 from a common 110/125 volt AC source in the United States. Equivalent sources may be used elsewhere. A suitable motor would be one rated at 178 horsepower output having two speeds of about 300 and 1200 r.p.m. A common drill motor which fits these specifications will function effectively. The motor will through a common chuck arrangement, not shown, cause the rotation of wheel 58 which is adapted to receive belt 62 through groove 60. A matching wheel 64 having groove 66 receives belt 62.

Gear box 67 is mounted on base 20 and is driven by wheel 64. Gear box 66 may suitably have a 60 to 1 ratio so that in conjunction with a 300 or 1200 r.p.m. electric motor shaft 68 would turn at either 5 or 200 r.p.m. with a 60 times increased torque output.

The output of shaft 68 is fed through a clutch device 71 which has matching clutch faces 79,72 to shaft 76 to cause the rotation of reel 77. Shafts 68 and 76 are support for rotation by bearings 70 and 84. A resilient member 82 shown as a coil spring fits around a part of shaft 76 and acts against stop 85 and one side 80 of reel 77 to urge the clutch faces into engagement.

Shaft 86 has a convenient handle 112 to move it horizontally. Shaft 86 has three locating and positioning bores 87 which are adapted for engagement by projecting finger 110 mounted on stop member 108 which can be mounted on the frame 10 or gear box 66. Shaft 86 slides in guide members 120, 122. Moving shaft 86 to the right as shown in the drawing, FIG. 4, shifts reel to the right and disengages clutch members 72, 74 permitting the reel to turn freely against the friction in the shaft 76 and the drag of rollers 92, 94. In this position, the aircraft type cable 96 is fed through conduit to be attached to cable to be pulled through the conduit. Sufficient friction is maintained on the reel to prevent snarling or "backlash" of the cable 96.

Figure 6:
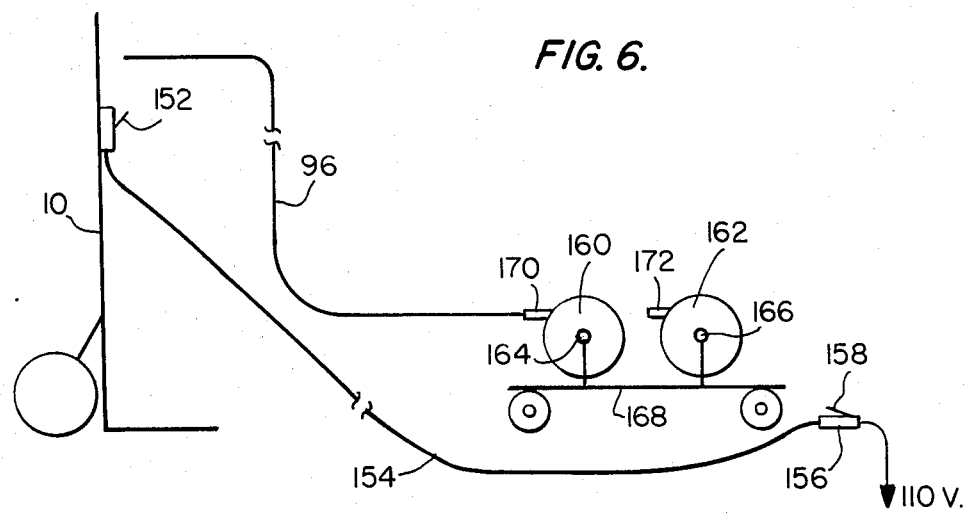
FIG. 6 shows a view of the present invention in operation.

Once cable 96 is attached to the cable to pulled, as shown in FIG. 6. The cable to pulled in on reels 160, 162, which are supported on axles 164,166 which is turn are mounted on a cart 168. An electrical switch box 150, having a switch 152 is connected to drill motor 54 by electrical connector 52. Similarly line 154 connects switch 152 in series with box 156 and second switch 158. A third switch 56 is also in series with the first and second switches and is located adjacent the motor 54. With this electrical hook-up, one operator can control the pulling of the cable 170, 172 through the conduit. The operator can be positioned at the upstream location and by means of switch 158 stop the operation if any snags or kinks develop. Previously, two operators were required to pull cable--one to pull the rope around the capstan and the other to watch the cable being pulled and to direct the first operator when the stop pulling in order to prevent damage to the cable being pulled.

In short the present invention turns a two person operation into a one person operation. The frame 10 with wheels is designed not to exceed about two feet in width so that it can easily be pulled through any common size door or doorway on a construction site. The prior art cable pullers such as those made by Greelee and Enerpac are sold and used as a set of parts to be carried in a box and assembled, disassembled and moved from cable pulling site to cable pulling site. These devices depending on manufacture and size range in weight from about 180 to 200 pounds. In contrast the present invention weighs about pounds.

The present invention was able to pull easily 300 feet of 4- 3/0 THW copper through 2 elbows and 90 feet of 4-500 MCM THW copper through three elbows. Both of these jobs would be very difficult for the electrician to accomplish with the Greenlee model 686 or the Enerpac models CP-3000 and CP-2000 or other equivalent devices.

In another example of the present invention's great value, electricians using the device were able to pull 4000 feet of No. 2 TH-HN copper and 2300 feet of No. 6 TH-HN copper in a total time of 12 hours including set-up time. Using the most favorable set of NECA guides this job would have taken 83.95 man hours. The inventors estimate that using their own skilled people and working at peak efficiency this job would have taken about 48 man hours using the Greenlee or Enerpac devices mentioned above. This work was performed pulling cable through about 10 stories which therefore makes the use of a large wheeled vehicle weighing a ton or more highly impractical. Further such a large device will not fit into some of the small areas which are necessary for its utilization. To accomplish a conduit pull as complicated as the one previously described required two operators. With conventional equipment the job would take at least three operators. The savings in labor time comes from several aspects of the invention. First, there is no heavy element to be hand carried and hand assembled. Second, rope is not pulled by a capstan which either requires two operators or one operator to stop from time-to-time to recoil the rope at his feet. Third, the force generated by present torque converted electrical motor is many time that which can be generated by a device operated as a capstan since rope slippage is factor.

Two further examples of the utility of the present invention are shown in the following chart:

| No. of Runs | Length of Run | Size of Wire | Weight of Wire | Time |
|---|---|---|---|---|
| 3 | 129 feet | 600 MCM | 1031.71 lbs. | 2 man |
| 1 | 129 feet | 250 MCM | 1031.71 lbs. | hours |

-continued

| No. of Runs | Length of Run | Size of Wire | Weight of Wire | Time |
|---|---|---|---|---|
| 1 | 129 feet | 3/0 | 1031.71 lbs. | including set-up |

Job description: 5 wires pulled through one 4 inch conduit through three 90° bends.
NECA - Estimate (most favorable) 23.09 man hours
Wire: THW copper

| No. of Runs | Length of Run | Size of Wire | Weight of Wire | Time |
|---|---|---|---|---|
| 3 | 308 feet | 250 MCM | 1021 lbs. | 5.56 man |
| 1 | 308 feet | 1/0 | 1021 lbs. | hours including |
| 1 | 308 feet | #2 | 1021 lbs. | set-up |

Job description: 5 wires pulled through one 3" conduit with three 90° bends.
NECA - Estimate (most favorable) 35.10 man hours
Wire: THW copper

We claim:
1. In a device for pulling electrical cable through conduit the combination comprising:
   a first rigid frame means having a plurality of support members;
   wheel means connected for rotation to said frame means to enable the frame means to be easily rolled from place to place in a wheelbarrow like fashion;
   power means rigidly and removably connected to said frame means; the power means having a rotatable output shaft;
   a torque multiplying, speed reducing means having a shaft for being driven by said output means and having an output shaft;
   a shiftable clutch means for receiving power from said torque multiplying speed reducing means;
   a reel member having sides mounted for rotation on a shaft means and said shaft means driven by the output side of said shiftable clutch means, said reel member adapted to accept a length of cable;
   a guide and support means fixedly connected to said frame means for holding said frame in a fixed position away from the conduit and for guiding the cable to be fed to reel member to said reel member;
   shiftable clutch means including first and second clutch face members having mutually engaging surfaces and a resilient member biasing said clutch members in a clutch engaging direction;
   a plurality of roller members mounted on a shift rod for engaging the sides of said reel member for causing the engagement and disengagement of said clutch means.
2. The device claimed in claim 1 wherein said shiftable clutch means includes a shaft member having a plurality of bores formed therein; a bore engaging member is fixed relative to the frame means for engaging one of the shaft member bores to hold the clutch members into or out of engagement.
3. The device claimed in claim 1 including further:
   a stiff leg member having mating means;
   mating means formed on said guide and support means for engaging the mating means on said stiff leg member.

* * * * *